No. 745,358. PATENTED DEC. 1, 1903.
E. R. LANPHER.
RUBBER TIRE SETTING MACHINE.
APPLICATION FILED NOV. 7, 1901.
NO MODEL. 3 SHEETS—SHEET 1.
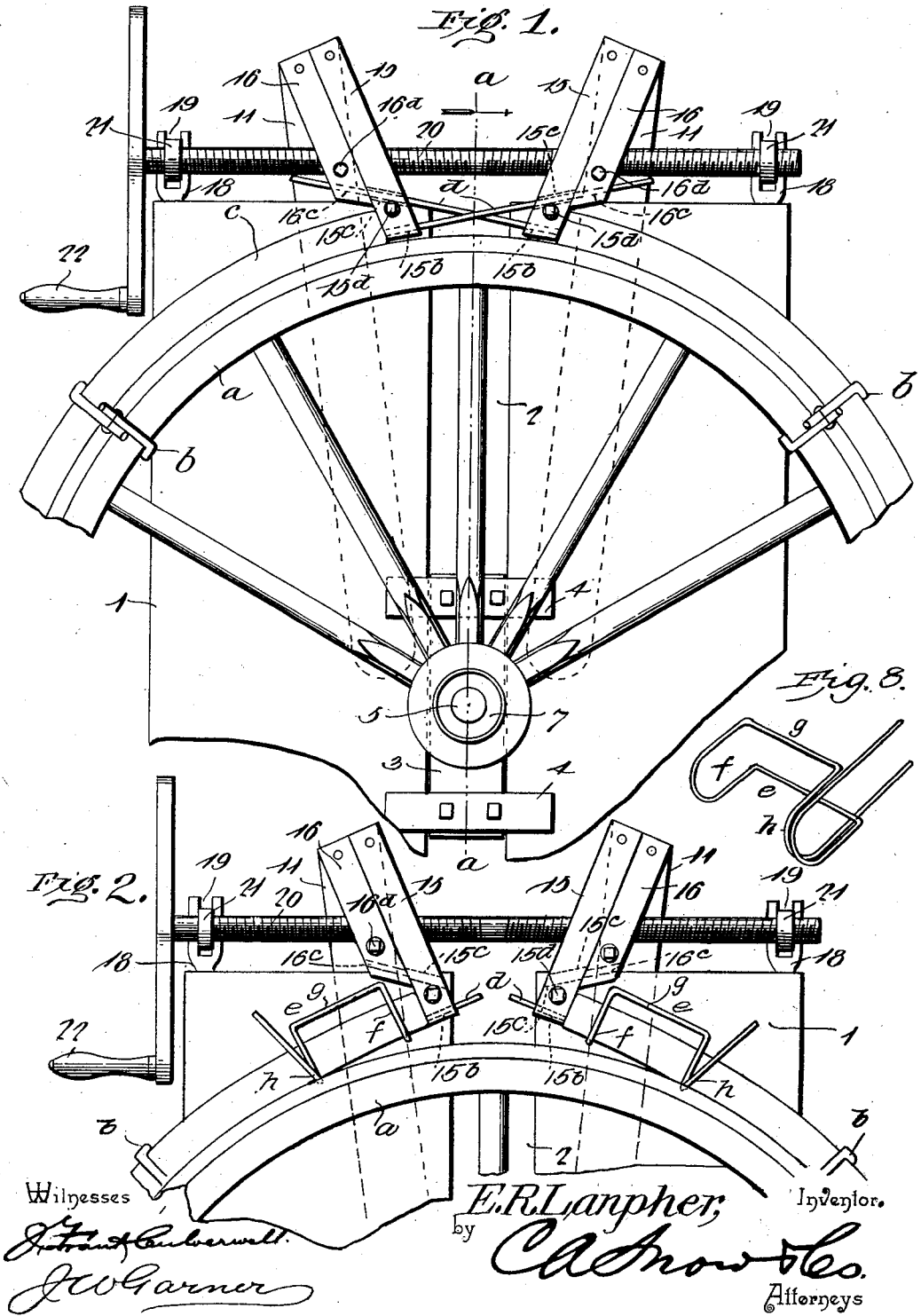

No. 745,358. PATENTED DEC. 1, 1903.
E. R. LANPHER.
RUBBER TIRE SETTING MACHINE.
APPLICATION FILED NOV. 7, 1901.
NO MODEL. 3 SHEETS—SHEET 2.
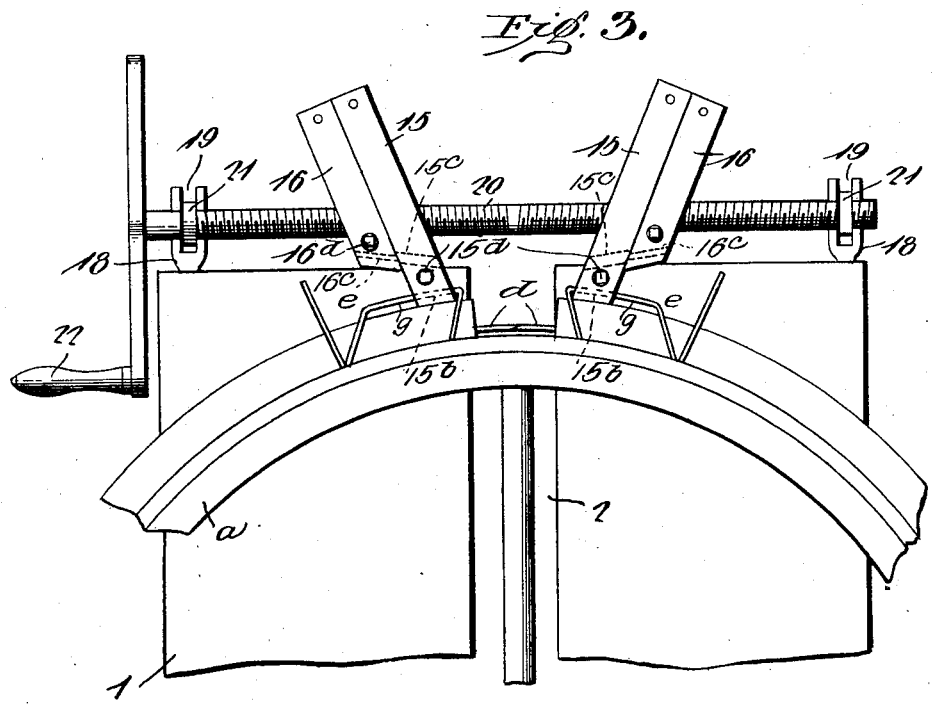
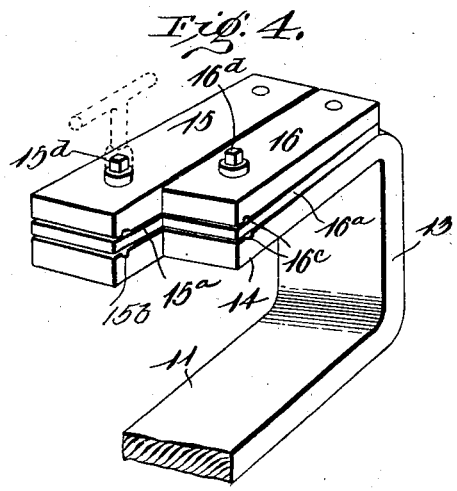
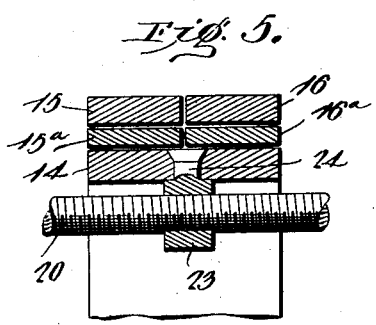
Witnesses E. R. Lanpher, Inventor.

No. 745,358. PATENTED DEC. 1, 1903.
E. R. LANPHER.
RUBBER TIRE SETTING MACHINE.
APPLICATION FILED NOV. 7, 1901.
NO MODEL. 3 SHEETS—SHEET 3.
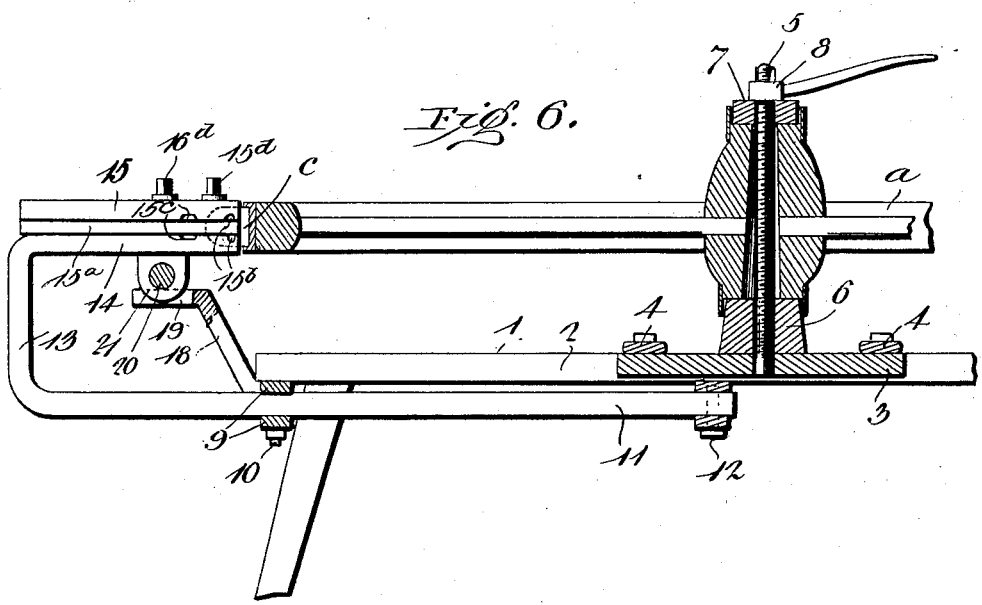
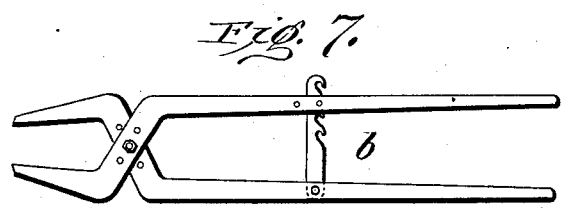
Witnesses E. R. Lanpher, Inventor.

No. 745,358. Patented December 1, 1903.

UNITED STATES PATENT OFFICE.

EARL R. LANPHER, OF CARTHAGE, MISSOURI.

RUBBER-TIRE-SETTING MACHINE.

SPECIFICATION forming part of Letters Patent No. 745,358, dated December 1, 1903.

Application filed November 7, 1901. Serial No. 81,415. (No model.)

*To all whom it may concern:*

Be it known that I, EARL R. LANPHER, a citizen of the United States, residing at Carthage, in the county of Jasper and State of Missouri, have invented a new and useful Rubber-Tire-Setting Machine, of which the following is a specification.

My invention is an improved machine for setting wire-cored rubber tires on channeled vehicle-wheels; and it consists in the peculiar construction and combination of devices hereinafter fully set forth and claimed.

In the accompanying drawings, Figure 1 is a top plan view of a rubber-tire-setting machine embodying my invention, showing the parts of the same in the position assumed when the wire cores are crossed between the ends of the tire and engaged by the clamps of the drawing-arms and while drawing and tightening the wire cores to compress the tire on and around the rim of the wheel before uniting the ends of the wire cores between the ends of the rubber tire. Fig. 2 is a similar view showing the positions assumed by the drawing-arms and clamps when the ends of the wire cores have been cut prior to being chamfered and showing the pull-wires attached to the end portions of the rubber tire. Fig. 3 is a similar view showing the ends of the wire cores united and the ends of the rubber tire secured to the jaws by pull-wires prior to the operation of the machine in drawing the ends of the rubber tire together. Fig. 4 is a detail perspective view of one of the drawing-arms and the clamps with which the same is provided. Fig. 5 is a detail sectional view showing a portion of the operating-screw, one of the drawing-arms, to which the screw is connected by a traveling nut, and the clamps on the said drawing-arm. Fig. 6 is a vertical longitudinal sectional view taken on a plane indicated by the line *a a* of Fig. 1. Fig. 7 is a detail elevation of one of the compression-tongs. Fig. 8 is a detail perspective view of one of the pull-wires.

In the embodiment of my invention I provide a suitable supporting frame or table 1, which has a longitudinal central guideway 2. In the said guideway is disposed an adjustable supporting-plate 3, on the upper side of which are bolted cross-bars 4, the ends of which project beyond the sides of the guideway 2 and bear on the top of the table or frame, and hence the supporting-plate is supported on the table or frame and is adapted to be moved longitudinally thereon. A screw-threaded spindle 5 extends upwardly from the adjustable supporting-plate and is carried thereby. On the said screw-threaded spindle is an adjustable supporting-cone 6, which is interiorly screw-threaded to engage the said spindle and is hence adapted to be vertically adjusted thereon. The wheel *a* on which a rubber tire is to be placed is placed on the spindle 5 with the inner end of its hub bearing on the cone 6. The latter being adjustable supports the wheel at the required elevation. I also provide a washer 7 to bear on the upper end of the wheel-hub and a compression-nut 8 to engage the washer therewith and hold the wheel firmly on the spindle.

A pair of bars 9, which are disposed one above the other at a suitable distance apart, are secured transversely under one end of the table or frame 1 by bolts 10. A pair of drawing-arms 11 pass between and operate between the said bars 9, which form guiding-supports therefor. The inner ends of the said drawing-arms are pivotally bolted under the table or frame, as at 12, and their outer ends, which project beyond one end of the table or frame, are upturned, as at 13, and then inturned, as at 14, to form heads. On the head of each of the drawing-arms are a pair of clamps 15 16, which are disposed side by side and are preferably of the form shown. The inner ends of the clamps 15 project beyond the inner ends of the clamps 16. In the form of my invention here shown the head 14 of each drawing-arm comprises the lower member of each of the clamps 15 16 carried thereby. An intermediate member for each clamp 15 is formed by a plate 15ª disposed between the same and the head 14, and an intermediate member for each of the clamps 16 is formed by a plate 16ª placed between said clamp and said head. The projecting end of each clamp 15 is provided with a pair of transverse grooves 15ᵇ, formed in the contacting sides of the sections of the clamp. In the form of my invention here shown, which is especially adapted for setting rubber tires which are provided with a pair of core-wires, each clamp 16 is provided with a pair of grooves 16ᶜ, disposed transversely therein, the said grooves being formed in the contacting sides of the sections of the said clamp. Each clamp 15 has similar grooves 15ᶜ, which lead to said grooves 16ᶜ, but are of greater diameter than said grooves 16ᶜ. Each clamp 15 is further provided with a set-screw 15ᵈ, and each clamp 16 has a similar set-screw 16ᵈ. A suitable wrench (shown in dotted lines in Fig. 4) is provided for turning the set-screws of the respective clamps.

Between the bars 9, near the sides of the frame or table 1, are bolted the inner ends of a pair of standards 18. The outer ends of the said standards project upwardly and outwardly from the table or frame 1 and are forked or bifurcated, as at 19. An operating-screw 20 is provided near its ends with annular shoulders 21, which are engaged by the forks of the standards 18. Said standards support said screw, as will be understood, and prevent the said screw from moving endwise when the same is rotated. The said operating-screw is provided with right and left hand screw-threads, which proceed, respectively, from the central portion of the said screw nearly to the ends thereof. At one end of the said operating-screw is a crank wheel or handle 22, by means of which it may be readily rotated. Traveling nuts 23 engage, respectively, the right and left hand threaded portions of the operating-screw and are respectively pivotally connected to the heads of the drawing-arms, as at 24, or in any other suitable manner. From the foregoing it will be understood that when the operating-screw 20 is rotated the heads of the drawing-arms will be simultaneously moved either toward or from each other, according to the direction in which the operating-screw is turned.

The operation of my invention is as follows: Initially the drawing-arms are moved by the operating-screw until the heads of the said arms are somewhat apart. The tire is then bent in approximately circular form to dispose the ends thereof opposite each other, the core-wires being disposed in the grooves 15ᵇ, crossed between the ends of the tire, and the end portions of the wires passed through the guide-grooves 15ᶜ 16ᶜ in the said clamps 15 16. The set-screws 15ᵈ are then tightened sufficiently to retain the wires in the grooves 15ᶜ, yet permit them to slip therein, and the ends of the wires are then pulled to draw the ends of the rubber tire against the outer sides of the projecting ends of the clamps 15. The set-screws 16ᵈ are then tightened to cause the wires to be firmly gripped by the clamps 16. The drawing arms are then moved from each other in opposite directions by turning the operating-screw, thereby pushing the end portions of the rubber tire back from the ends of the wire, hence compressing the rubber tire in the direction of its length. The wheel having been placed in position on the spindle 5 and by means of the cone 6 adjusted so that the rim of the wheel is level with the tops of the clamps 15 16, the rubber tire is placed in the channel around the rim thereof on the side of the wheel opposite the clamps and secured thereto at a distance of about a foot from each end of the tire by a pair of compression-tongs b of suitable construction, one of which is shown in Fig. 7. The wheel is then shifted by moving the supporting-plate 3 or by pushing on the wheel to cause the latter to move from the clamps, the end portions of the rubber tire being thus disengaged from the channeled rim of the wheel, as shown in Fig. 2. The operating-screw is then again turned to move the drawing-arms somewhat farther apart, hence somewhat further compressing the end portions of the rubber tire between the clamps 15 and the tongs b. The set-screws 15ᵈ are then tightened, thereby causing the clamps 15 to grip the wires at points immediately beyond the ends of the rubber tire, the set-screws 16ᵈ are loosened to enable the end portions of the wires to slip in the grooves in the clamps 16, and the operating-screw is then turned to move the drawing-arms toward each other, thereby drawing the wires and tightening the tire around the wheel, as will be understood. The wires are then cut at the required points, the operating-screws turned to open the drawing-arms sufficiently to enable the ends of the wires to be chamfered, and pull-wires e, for a purpose hereinafter described and bent in the form shown in Fig. 8 of the drawings, are placed under the end portions of the rubber tire. The operating-screw is then turned to draw the drawing-arms toward each other, thus overlapping the chamfered ends of the core-wires, and the same are then brazed, thereby uniting the ends of the respective core-wires. The latter are then released from the clamps 15 by loosening the set-screws 15ᵈ. It will be understood that the ends of the rubber tire at this stage of the procedure are several inches apart and that it is necessary to pull them together on the brazed portions of the core-wires to complete the operation of setting the tire. Each of the pull-wires e is first doubled to form a loop f, then bent at right angles to form the portions g, and then again bent to form the loops h. The pull-wires are attached to the end portions of the tire, the latter lying in the loops f h, and the portions or intermediate loops g of said pull-wires are secured in the clamps 15, the end portions of the tire lying across the outer ends of said clamps. The operating-screw is then turned to cause the draw-arms to approach each other, thereby causing the clamps 15, through the wires e, to pull the ends of the tire together on the core-wires. The pull-wires e are then removed from the clamps and from the tire and the operation of setting the latter is complete.

Having thus described my invention, I claim—

1. The apparatus for manipulating rubber tires, comprising means for clamping both ends of the retaining-wire and drawing the same, and means movable with the clamping means for simultaneously compressing both ends of the rubber of the tire in opposite directions away from the ends of the retaining-wire.

2. The apparatus for manipulating rubber tires, comprising two members each having means for clamping one end of the core-wire and means for engaging against the end of the rubber tire opposite to that end of the tire from which the clamped wire projects, and means for simultaneously moving said members in opposite directions to thereby draw and tighten the core-wire and at the same time compress both ends of the rubber of the tire in opposite directions away from the ends of the wire.

3. In a rubber-tire-setting machine, the combination of a pair of drawing members, means to move said drawing members toward or from each other simultaneously, and a pair of clamps on each of said drawing members, one clamp of each pair projecting beyond the other, so that one clamp of each member may grasp one end of the core-wire and the other clamp on the same member may grasp the other end of the wire, substantially as described.

4. In a rubber-tire-setting machine, the combination of a pair of drawing members, a right and left hand threaded screw, bearings for the latter to prevent said screw from moving endwise, traveling nuts on said screw, connected to said drawing members, to simultaneously move said drawing members in opposite directions when said screw is turned, and a pair of clamps on each of said drawing members, one clamp of each pair projecting beyond the other so that one clamp of each member may grasp one end of the core-wire and the other clamp on the same member may grasp the other end of the wire, substantially as described.

5. In a rubber-tire-setting machine, the combination of a pair of drawing members, means to move said drawing members toward or from each other, and a pair of clamps on each of said drawing members, one clamp of each pair projecting at one end beyond the other, said clamps having transverse wire-engaging grooves near their inner ends, and the longer clamp of each pair having also a transverse guide-groove which communicates with the wire-engaging groove of the adjacent clamp, for the purpose set forth, substantially as described.

6. In a rubber-tire-setting machine, the combination of a supporting-frame, having movable bearings, a right and left hand threaded screw mounted in said bearings, and movable therewith in a direction at right angles to the axis of the screw, a pair of drawing members, pivoted to said supporting-frame, connections between said drawing members and said screw, means carried by said drawing members, to engage the ends of a rubber tire and of the core wire or wires thereof, and a shiftable wheel-support, mounted on said supporting-frame, and movable toward and from said drawing members, substantially as described.

In testimony that I claim the foregoing as my own I have hereto affixed my signature in the presence of two witnesses.

EARL R. LANPHER.

Witnesses:
S. J. CHITWOOD,
BAIRD HAUGHAWOUT, Jr.